March 14, 1944.   R. ULLMAN   2,344,116
MEASURING INSTRUMENT
Filed Feb. 1, 1940   2 Sheets-Sheet 1

INVENTOR
ROY ULLMAN
BY George M. Beauchamp
ATTORNEY

March 14, 1944.   R. ULLMAN   2,344,116
MEASURING INSTRUMENT
Filed Feb. 1, 1940   2 Sheets-Sheet 2

INVENTOR
ROY ULLMAN
BY
ATTORNEY

Patented Mar. 14, 1944

2,344,116

UNITED STATES PATENT OFFICE 2,344,116

MEASURING INSTRUMENT

Roy Ullman, Roslyn, Pa., assignor to The Brown Instrument Company, Philadelphia, Pa., a corporation of Pennsylvania Application February 1, 1940, Serial No. 316,744

8 Claims. (Cl. 177—311)

The present invention relates to self balancing potentiometers and more particularly to potentiometers which are successively used to indicate the values of a plurality of conditions.

In some installations of potentiometer measuring instruments they are used to measure successively a large number of conditions such as temperature. It is customary, for example, to have temperature measuring elements located at various points throughout a building and periodically have an attendant connect the instrument to each of these elements to get an indication of the temperature at the location of each. As each of the temperatures is indicated the attendant makes a record of it for future reference. Since it is generally a characteristic of such measuring instruments that the indicating member moves slowly as it nears the correct point the attendant has to wait for several extra cycles to take place on each reading in order to be sure that the pointer is correctly positioned before the indication can be recorded. When there are a large number of temperatures to be recorded the additional time needed for each reading to insure its correctness amounts to an objectionally large total.

It is an object of my invention to overcome this undesirable feature of previous instruments by providing an indicating signal that is periodically flashed on when the instrument reaches its balance point.

While I describe my invention as being used in connection with a self balancing potentiometer measuring temperature to indicate when the same is in balance it will be obvious to those skilled in the art that the improvement of my invention is applicable to other types of instruments as well as being applicable to instruments of the type described measuring other conditions.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

The potentiometer mechanism and measuring circuit shown herein are of the type fully disclosed and described in the Harrison et al. patent, 2,150,502, issued March 14, 1939, and need not be described in detail herein except insofar as the operative parts of the mechanism affect the invention of this application.

Figure 1:
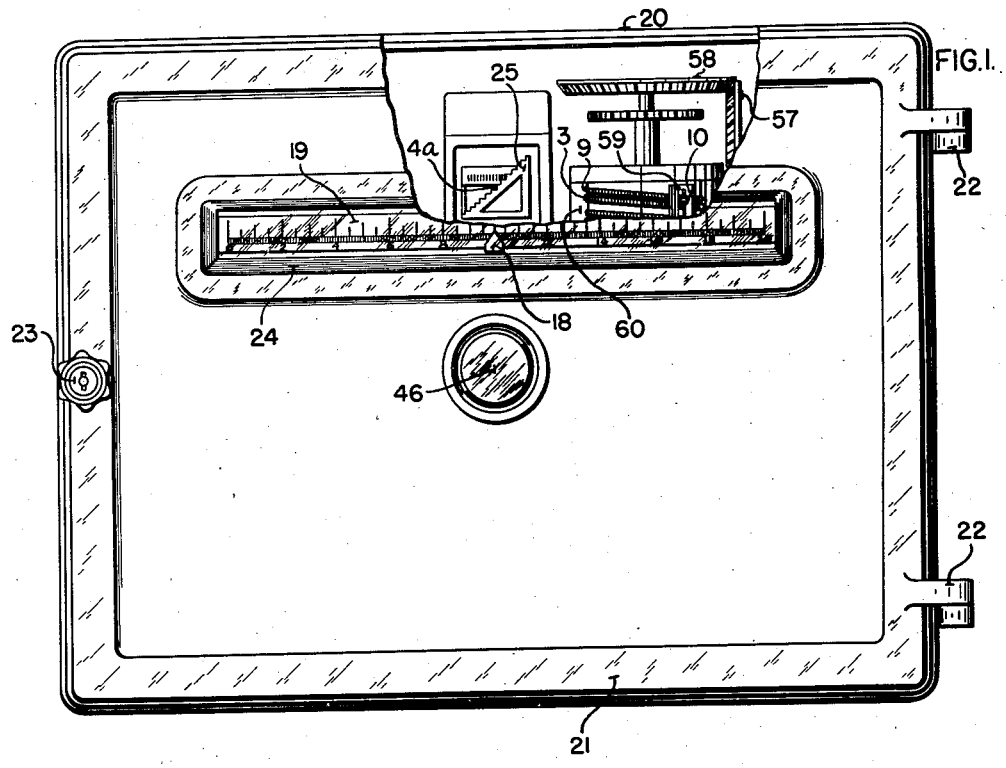
Fig. 1 is a front view of the instrument partly broken away to show some of its interior mechanism.
Figure 2:
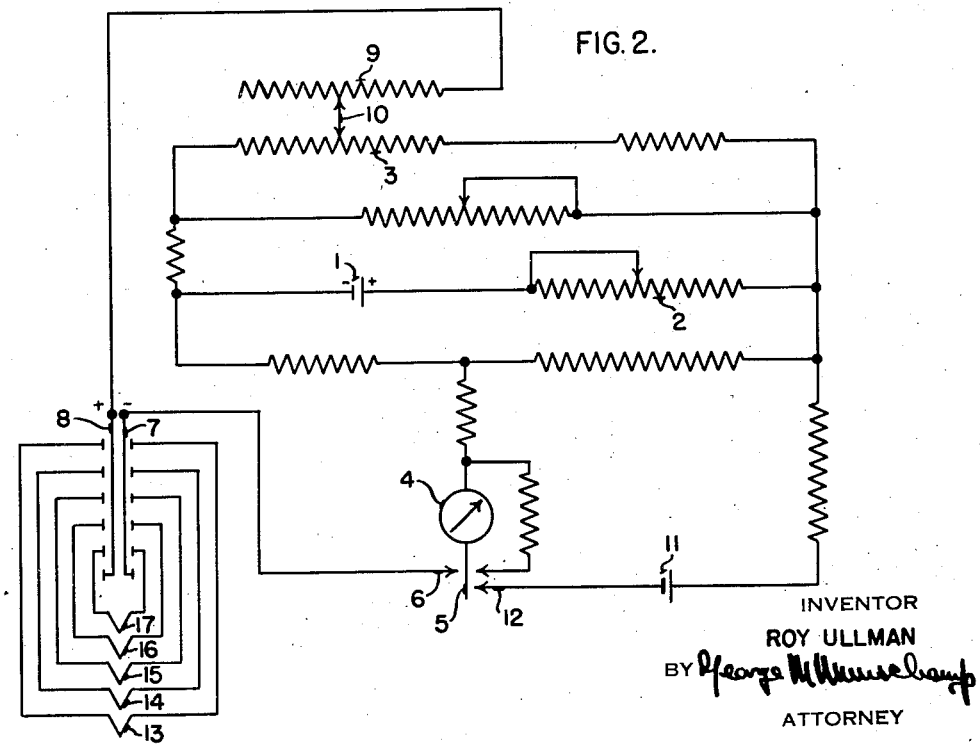
Fig. 2 is a wiring diagram of a potentiometer circuit.

Referring to Figure 2, there is shown a potentiometer circuit in which the numeral 1 designates a substantially constant source of electromotive force connected in series with an adjustable resistor 2, the adjustment of which is adapted to vary the current flow in the circuit containing the cell 1 and a slidewire 3. The measuring circuit includes a galvanometer 4, switch contacts 5 and 6, conductors 7 and 8, across which are connected a source of potential such as a thermocouple, the valve of which is to be measured, resistor 9, and sliding contact 10 to the slidewire 3. Also included is a standardizing circuit including the galvanometer 4, a source of standard current 11 and contacts 12 and 5. The lower ends of conductors 7 and 8 may be moved to various positions to insert any one of the thermocouples 13, 14, 15, 16 or 17 into the measuring circuit. This switching arrangement may take any well known form and may be located either in the instrument casing or adjacent thereto and may be either automatic or manual.

The operation of a potentiometer circuit of this type is well known and it is sufficient to say that when one or another of the thermocouples is inserted in the measuring circuit the galvanometer will be deflected. The contact 10 is then moved along the resistance 9 and slidewire 3 until the unknown voltage of the thermocouple is balanced by the known voltage of battery 1, at which time the galvanometer pointer is in its neutral position. The position of contact 10 is then indicative of the value of the temperature to which the thermocouple is subjected.

Figure 3:
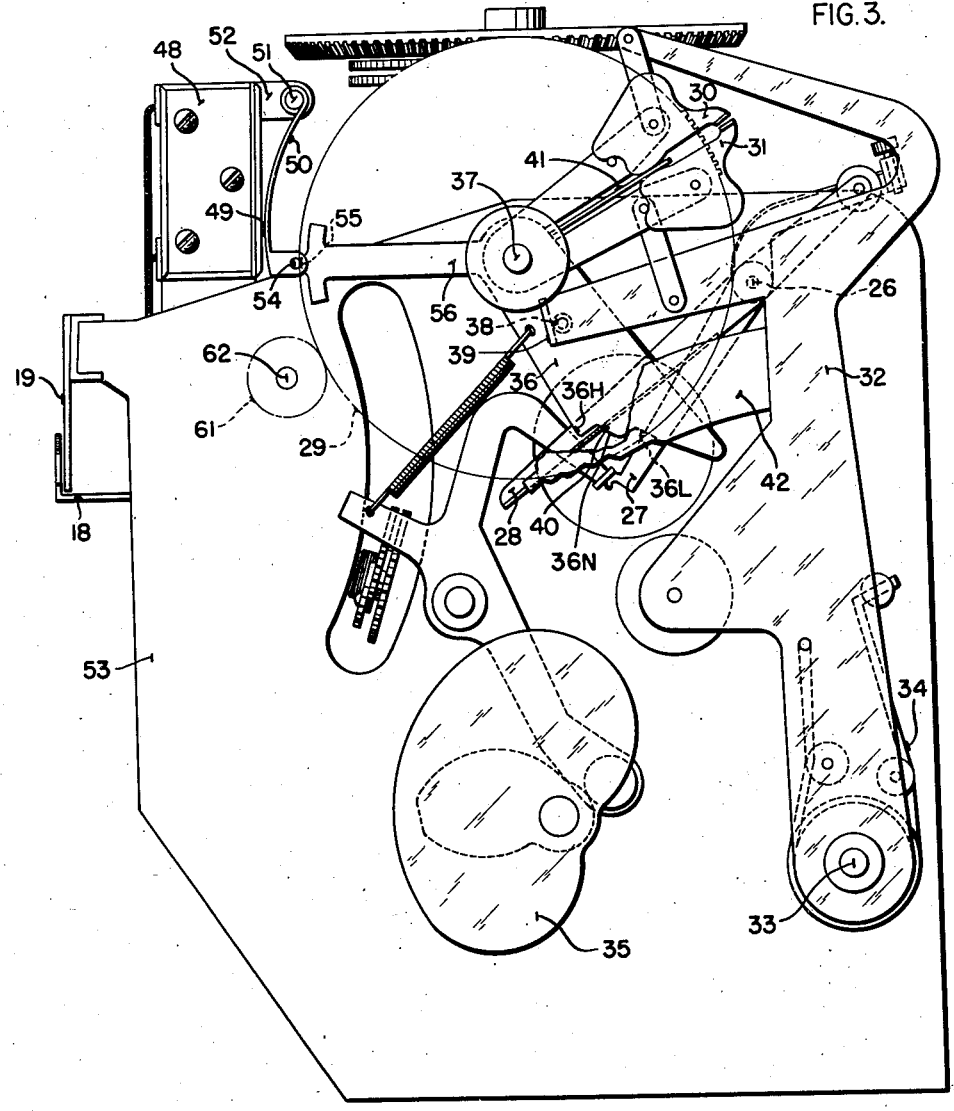
Fig. 3 is a side view of certain operative parts of the instrument.
Figure 4:
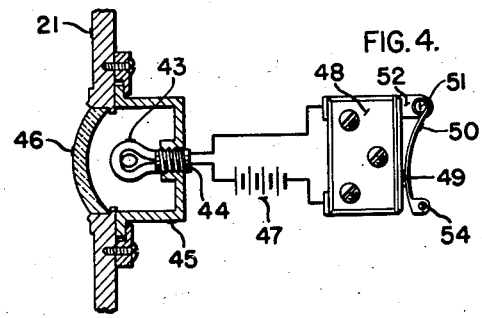
Fig. 4 is a view of the signal lamp and its circuit.

The means for moving the contact and shifting an exhibiting or indicating member 18 across a scale 19 is herein shown as taking the form of the mechanism shown in the above mentioned patent, 2,150,502. This mechanism is housed within a casing 20 having a door 21, hinged thereto at 22 and provided with a locking knob 23. The door has a window 24 in it through which may be seen the indicator 18 and scale 19. Within the casing there is a step-table 25 that is periodically brought into engagement with the pointer 4a of the galvanometer and is stopped in a position corresponding to the deflection of said pointer. Movement of this step-table is imparted by a shaft 26 (Fig. 3) to an arm 27 and to a secondary pointer 28 that is thereby positioned in accordance with the deflection of the pointer 4a.

The position of the secondary pointer 28 controls the direction and amount of movement of the contact 10 along the slidewire 3 and the movement of the pointer 18 along the scale 19. Movements are imparted to the contact and pointer by a gear 29 that is driven in one direction or the other by a pair of pawls 30 and 31 that are in turn moved by a driving lever 32, pivoted at 33, and biased in a counterclockwise direction in Figure 3 by a spring 34. The lever 32 is periodically moved in a clockwise direction against the tension of the spring 34 by a constantly rotating cam 35 and at the same time moves a pawl selector lever 36 counter-clockwise around the shaft 37, upon which gear 29 is mounted, by means of engagement between a projection 38 on the pawl selector lever 36 and a projection 39 on the drive lever 32. It is at this time that the secondary pointer is free to move.

Upon return movement of lever 32 under the action of spring 34 one of three shoulders 36L, 36N or 36H of the pawl selector lever 36 engages the edge of an opening 40 in the secondary pointer to hold that pointer in position. The shoulder that engages the edge of opening 40 determines which of the pawls will engage and drive gear 29. This is accomplished by means of an arm 41, fastened to the pawl selector, that serves to move one of the pawls around its pivot into mesh with the teeth of the gear 29. If the galvanometer pointer has deflected in a direction to indicate that the value of the temperature being measured is lower than the then existing indication of pointer 18, the secondary pointer 28 will be in a position so that its opening 40 will be in the path of shoulder 36L. The pawl selector lever 36 will then move clockwise of the position shown and arm 41 will force pawl 31 into mesh with gear 29. If the galvanometer pointer deflects in a direction to indicate that the condition is higher than the existing measurement, the secondary pointer will be positioned in the path of shoulder 36H and the pawl selector lever will be positioned counter-clockwise of the position shown with pawl 30 in engagement with gear 29. If the galvanometer pointer does not deflect out of its neutral position the edge of opening 40 will be engaged by shoulder 36N, as shown, and neither of the pawls 30 or 31 will engage the gear 29. The amount of movement imparted to the gear 29 by the pawls, as the driving lever 32 moves counter-clockwise, is determined by engagement between the end of secondary pointer 28 and one of the shoulders on a member 42 that is attached to the lever 32.

The rotation of gear 29 adjusts the contact 10 by means of a gear 57 on the shaft 37 and a gear 58 driven thereby. The latter gear rotates a shaft carrying a contact supporting arm 59 to move the contact 10 along the slidewire 3 which is wound in the form of a helix around a support 60. The gear 29 adjusts the indicator 18 by means of a gear 61 driven thereby. The gear 61 is attached to a helically threaded shaft 62, as shown in the above identified patent, which thread causes a carriage carrying the indicator to move back and forth across the scale 19.

From the above description it will be seen that the pawl selector lever 36 is periodically moved from an extreme counter-clockwise position to a position determined by the engagement between one of its shoulders and the edge of opening 40. When the galvanometer pointer 4a is in its neutral position indicating that the potentiometer circuit is in balance and that the indicating member 18 is properly positioned along the scale 19, the pawl selector lever will be stopped with its shoulder 36N in engagement with the edge of opening 40 for a large portion of each cycle of the instrument. This position of the parts is used to actuate a signal to indicate that the member 18 is correctly positioned.

The signal shown herein is an electric bulb 43 that has a carbon filament which is comparatively slow in heating. The bulb 43 is mounted in a socket 44 which is in turn supported in a small casing 45 fastened to the inside of the door 21 below the window 24. The casing surrounds a lens 46 in the door so that when the bulb 43 is lit to signal that the instrument is in balance this signal may be seen from the front of the instrument. The bulb 43 is in circuit with a source of electrical energy 47 and a switch 48 that is closed when the instrument is in balance. The switch 48 is closed by pressure on a plunger 49 extending from it that is imparted by a lever 50 pivoted at 51 to a bracket 52 extending from the switch.

The switch 48 is mounted on a sideplate 53 of the instrument in such a position that a rod 54 on the lower end of actuating lever 50 will be in the path of a projection 55 on an arm 56 of the pawl selector lever 36. It will therefore be seen that as the pawl selector 36 is moved on its excursion the projection 55 will bear against the rod 54, and, through lever 50, force plunger 49 to the left, closing the switch. Since the bulb 43 is of the carbon filament type the momentary closing of switch 48 as arm 56 is moving through its path is not of a sufficient length of time for the filament of the bulb to heat up. When, however, lever 36 is stopped in its neutral position, the projection 55 engages arm 54 for a sufficient length of time for the bulb 43 to light up and indicate that the instrument is in balance.

In operation, as first one of the thermocouples and then another is connected in the potentiometer measuring circuit the instrument will come into balance and close the circuit to the bulb 43 to indicate that balance has been reached. A reading may be immediately made and another thermocouple connected to the instrument. Since a signal is given as soon as the instrument is in balance there is no time lost in shifting from one thermocouple to another and no uncertainty as to when the indicator 18 is correctly positioned.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent, is:

1. In a measuring instrument, the combination with an element responsive to the value of a condition to be measured, an exhibiting member movable to various positions to indicate the value of said condition, mechanism including a periodically operated member to move said exhibiting member to a position corresponding to the value of said condition, switch means, means operated by said periodically moving member to periodically close said switch, and means operated by said switch to give an indication when the exhibiting member is properly positioned.

2. In a measuring instrument, an element responsive to the value of a condition to be measured, an exhibiting member to indicate the value of said condition, mechanism operative to move said exhibiting member in steps to a position corresponding to the value of said condition as measured by said element, signal means to indicate when said member is properly positioned, a circuit for said signal means, a switch in said circuit, and means operated by said mechanism during each step to actuate said switch, said means operating to actuate the switch longer each step when the exhibiting means is properly positioned.

3. In a measuring instrument, means to measure the value of a variable condition, an exhibiting member to indicate the value of said condition, mechanism operative to shift said member to positions corresponding to the value of said condition as measured by said means, a slow operating signal light, a periodically moving part forming an element of said mechanism, a switch for said light located adjacent the path of movement of said part, and means to actuate said switch periodically by said part for a short portion of each period before said member is properly positioned and a long portion of each period after said member is properly positioned.

4. In a self balancing measuring instrument, an element deflecting to either side of a neutral position in response to instrument unbalance, an exhibiting member, mechanism operated in response to deflection of said element to rebalance said instrument and simultaneously move said exhibiting member to a position corresponding thereto, a part forming part of said mechanism periodically moved through a path terminating in a neutral position or a position on one side thereof depending upon whether said element is in its neutral position or on one side thereof, signal means operated by said part as the latter moves through its neutral position, whereby the period of operation of signal means is longer when said element is in its neutral position and the path of movement of said part is terminated in its neutral position.

5. In a self-balancing measuring instrument, the combination of an element movable to a position depending upon the value of a measurable condition, a signal light to indicate when said element is properly positioned, mechanism responsive to instrument unbalance to rebalance said instrument and simultaneously adjust said element, said mechanism including a part periodically movable through a path, said part being positioned at a given point for a large proportion of each period of movement when said instrument is in balance, a switch for said signal lamp adapted to be momentarily closed as said part passes through said point and to be continuously closed when said part stops at said point, and means operated by said part to close said switch.

6. In a self-balancing measuring instrument, the combination of a measuring element deflecting from a neutral position into a position on one side thereof in response to unbalance of the instrument, mechanism operable in response to deflection of said element to return the element to its neutral position and rebalance the instrument, said mechanism including a part periodically moved from a given position to one of a plurality of positions depending upon whether said element is on one side of its neutral or in its neutral position, signal means and means operated by said part to control said signal means in accordance with which of its plurality of positions said part stops in.

7. In a self-balancing potentiometer, the combination of an element responsive to the value of a condition, a galvanometer operated by said element to unbalance said instrument in accordance with changes in said condition, automatic means to rebalance said instrument in response to the occurrence of an unbalance thereof as a result of a change in the condition, signal means to indicate when said instrument is balanced, and mechanism forming part of said first means to operate said signal means comprising a switch actuating member, means to move periodically said switch actuating member into and out of switch actuating position, said moving means operating to hold said member in switch actuating position when said instrument reaches balance, and a switch operated by said member to control said signal means.

8. In a measuring instrument, the combination of an element responsive to the value of a condition to be measured, an exhibiting member to indicate the value of said condition, means to move said member to a position corresponding to the value of said condition as measured by the said element, signal means to indicate when said member is properly positioned comprising a slow operating lamp, a switch to operate said lamp, a part, means to periodically move said part through a path to either side of a switch operating position and passing through said position to momentarily close said switch, the lamp being so slow to operate that said momentary contact will have no effect, said part remaining in switch operating position for a comparatively long period of time when said instrument is balanced whereby said signal lamp will be operated.

ROY ULLMAN.